United States Patent Office 2,721,000
Patented Oct. 18, 1955

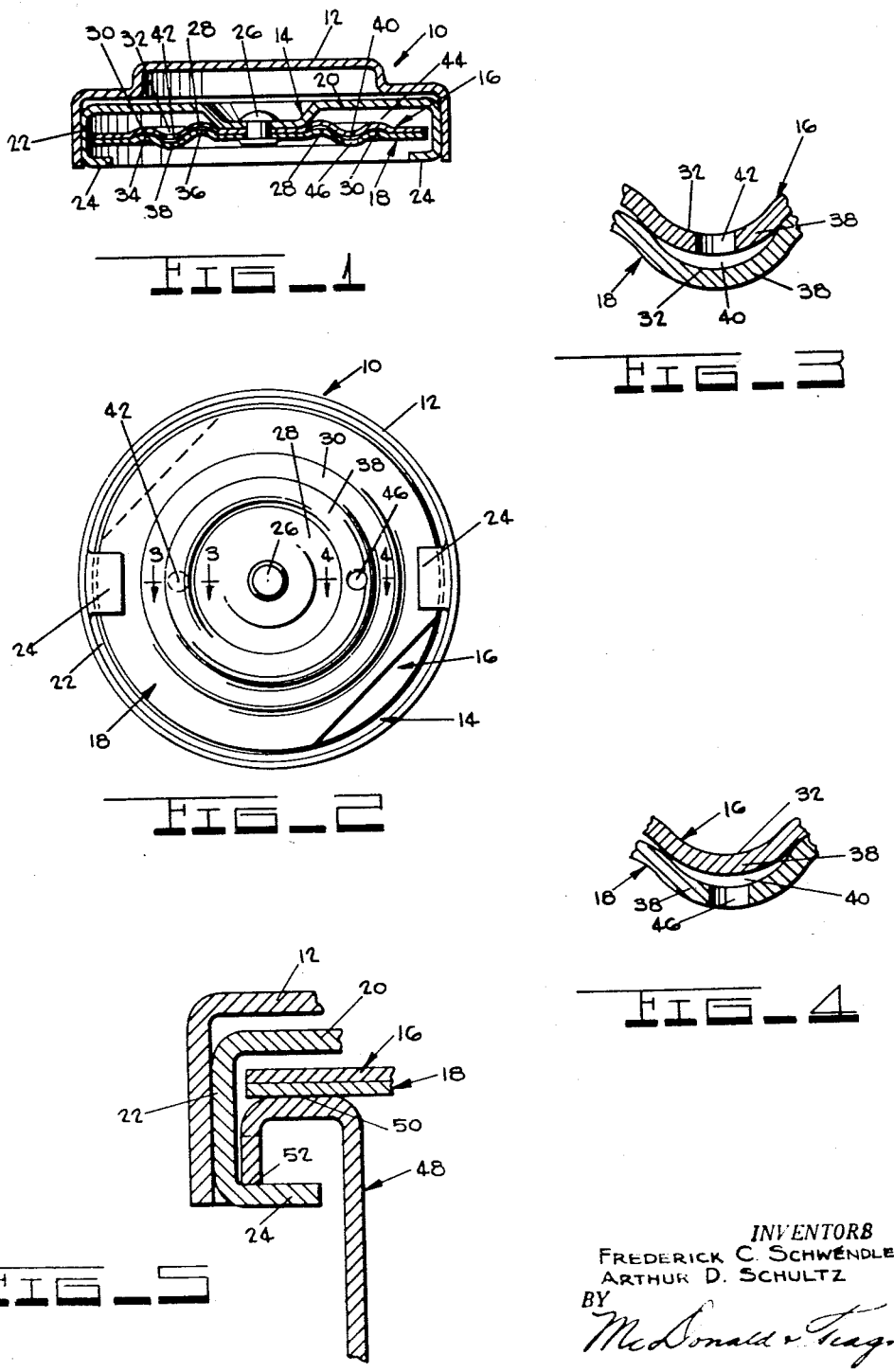

2,721,000
VENT CAP

Frederick C. Schwendler, Cleveland, and Arthur D. Schultz, Mayfield Heights, Ohio, assignors to Eaton Manufacturing Company, Cleveland, Ohio, a corporation of Ohio Application April 1, 1952, Serial No. 279,736

8 Claims. (Cl. 220—44)

This invention relates to closures for fuel containers and more particularly to vented caps for vehicle fuel tanks.

Broadly the invention comprehends the provision of a fuel cap for vehicle fuel tanks that has a continuously open air vent therein effective to permit of the venting of said fuel tanks to the atmosphere while preventing the slopping or leakage of fuel from said tanks.

Among the principal objects of the invention is the provision of an air venting cap for fuel tanks, that:

1. Is simple and economical of construction;
2. Has an open air passage through the cap but which passage defines a circuitous path effective to prevent the leakage of fuel therethrough;
3. Utilizes two juxtaposed diaphragms providing a circuitous air passage therethrough and therebetween and affording a leak proof sealing surface; and
4. Comprises a minimum of parts and does not require a resilient gasket for the effective sealing engagement thereof upon an appropriate filler neck therefor.

Other objects and advantages of the invention will appear from the following description taken in connection with the drawings forming a part of the specification; and in which:

Fig. 1 is a vertical cross-sectional view of a fuel cap, embodying the invention;

Fig. 2 is a bottom elevation view of the cap of Fig. 1;

Fig. 3 is an enlarged fragmentary cross-sectional view taken substantially along lines 3—3 of Fig. 2;

Fig. 4 is an enlarged fragmentary cross-sectional view taken substantially along lines 4—4 of Fig. 2; and Fig. 5 is an enlarged fragmentary cross-sectional view of a portion of the cap of Figs. 1 and 2 in assembly on a fragmentary portion of a filler neck.

Similar reference characters indicate corresponding parts throughout the several views of the drawings.

This fuel cap was devised for the purpose of providing a cheap and simple cap for a vehicle fuel tank permitting of the continuous venting of the interior of the fuel tank while preventing spillage of fuel from the tank in the normal course of travel of a vehicle embodying said tank. Furthermore, in addition to the provision of simple means providing a continuously open air venting passage through the cap, sealing gasket means are dispensed with. These results are achieved through the use of a pair of like juxtaposed resilient diaphragms having circularly grooved surfaces and wherein as juxtaposed a circular passage is provided therebetween. A hole is provided in one diaphragm communicating with the circular passage disposed 180° away from a hole in the other diaphragm whereby a continuous circuitous air vent passage provides communication between the opposite sides of the diaphragms. An annular surface on one of the diaphragms, near the external periphery thereof is adapted to have sealing engagement on a sealing surface of a filler neck upon which the cap is adapted to be assembled.

Referring to the drawings for more specific details of the invention 10 represents generally a cap for fuel tanks and the like comprising basically, a cup-shaped cover member 12, a cup shaped inner member 14, and a pair of resilient diaphragms 16 and 18 respectively.

Cover member 12 constitutes the outer sheath or cover of the cap which is adapted to be grasped by the hand in the application or removal of the cap from an appropriate fuel tank filler neck therefor.

Cup-shaped member 14 is welded, brazed or otherwise fixedly secured to the cover member 12 and includes an end disk portion 20 and an integral short length annular flange or sleeve portion 22. Radially, inwardly turned, diametrically opposite tabs or fingers 24 are provided on the end of the sleeve portion 22 on the axial extremity thereof opposite from the disk portion 20.

The diaphragms 16 and 18 are circular in form and are arranged in juxtaposed relation to one another fixedly secured by a rivet 26 centrally of disk portion 20 of the cup-shaped member 14. The diaphragms are substantially identical and of a diameter less than the inner diameter of the sleeve portion 22 of member 14. As secured on the member 14 the diaphragms 16 and 18 are disposed axially within the member 14 and approximately axially intermediate the disk portion 20 and radially inwardly turned tabs 24, the purpose of which will hereinafter appear.

Each of the diaphragms 16 and 18 has circular corrugated surfaces providing on one axial face two concentric circular beads or humps 28 and 30 separated by a circular groove 32 while the opposite axial face thereof has two concentric circular grooves 34 and 36 separated by a circular bead or hump 38. It is to be noted that because of the uniform thickness of the diaphragms that the grooves 34 and 36 are formed as a result of beads 28 and 30 whereas groove 32 is formed as a result of bead 38. As assembled juxtaposed one another with the beads 28 and 30 of diaphragm 18 seated in the grooves 34 and 36 of diaphragm 16, a circular passageway 40 is provided between the bead 38 on diaphragm 16 and groove 32 in diaphragm 18. This passageway is possible since the outer curvature of the bead 38 is greater than the curvature of the wall adjacent the groove 32. Figs. 3 and 4 illustrate this bead and groove arrangement and the passageway formed therebetween.

A hole 42 extending axially through bead 38 of diaphragm 16 provides communication between passageway 40 and an annular chamber 44 defined between the inner surface of the disk portion 20 of member 14 and the outer axial surface of diaphragm 16. A hole 46 extending axially through bead 38 of diaphragm 18 provides communication between passageway 40 and a zone adjacent the outer axial surface of diaphragm 18.

The holes 42 and 46 are purposely displaced 180° from one another so that no direct axial passage is had through both diaphragms thereby necessitating the air or fuel, as the case may be, to follow a circuitous path by way of holes 42 and 46 and passageway 40. Although a displacement of 180° in the positioning of the holes 42 and 46 is preferable the displacement can be of a lesser degree without materially affecting the purpose thereof.

Because of the resiliency of the diaphragms 16 and 18 their peripheral complementary annular surfaces bear upon one another and as such afford a unit of reasonable resilient stiffness whereby upon the application of the cap on a filler neck 48 as shown by Fig. 5, an ample resilient sealing load is applied effective for the sealing of the outer axial surface of diaphragm 18 upon the sealing surface 50 of filler neck 48.

Tabs 24 as received in appropriate slots, not shown, in the filler neck bear on cam surfaces 52 formed on the filler neck whereupon the diaphragms 16 and 18 are displaced axially a slight amount relative to cup-shaped member 14 and impress a sealing load thereon.

With the cap 10 applied to filler neck 48, air can pass between the interior of the tank to which the filler is attached and the atmosphere by way of hole 46, passageway 40, hole 42, chamber 44 and around the peripheral edge of diaphragms 16 and 18 past the end of sleeve 22 of the member 14.

It will be apparent that for fuel to leak from the tank past the cap it will be necessary for it to follow the same circuitous path as in the case of air venting of the tank and accordingly even though the fuel in the tank might be violently splashed about, it is practically impossible for it to escape therefrom.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. A closure comprising a cup-shaped member, and a pair of resilient circular substantially identical metallic diaphragms, arranged juxtaposed one another and fixedly secured centrally thereof to the center portion of the cup-shaped member in concentric arrangement within the cup-shaped member of a diameter less than the inner diameter of the sleeve portion of the cup-shaped member, said diaphragms having a circular passageway therebetween disposed centrally of axial surface engaging portions of the diaphragms located centrally and peripherally of the diaphragms and a hole in one diaphragm communicating with the passageway and a hole in the second diaphragm, angularly disposed from the hole in the other diaphragm, communicating with the passageway, said outer annular portions of the diaphragms being axially moveable relative to the cup-shaped member.

2. A closure comprising a member having locking means on one axial extremity thereof for engagement with a cam portion of a filler neck to which the closure is adapted to be applied, and a pair of resilient diaphragms arranged in adjacent bearing relation to one another secured centrally thereof to the member along the axis thereof and with the outer annular portions thereof free from engagement with the member permitting of the axial flexing thereof relative to the member, an annular axial face portion on one of the diaphragms for sealing engagement on an annular surface of the filler neck, said diaphragms providing a closed circular passageway axially therebetween concentrically disposed to central and peripheral axially engaged face portions of the diaphragms and a hole in one diaphragm communicating with the passageway and a hole in the second diaphragm, remotely disposed from the hole in the other diaphragm, communicating with the passageway.

3. A closure according to claim 2 wherein the diaphragms are metallic.

4. A closure for application to a filler neck of a fuel container comprising a member having locking means on one axial extremity thereof for engagement with a cam portion of the filler neck to which the closure is applied, and a pair of resilient diaphragms arranged in juxtaposed relation to one another secured centrally thereof to the member along the axis thereof with the annular portions thereof outwardly radially disposed from their connection with the member, being arranged in opposed surface engaging relation and free to flex axially relative to the member, said diaphragms each having a part complementary to the other arranged in nested juxtaposed relation to one another to provide a confined circular passageway therebetween and a hole in one diaphragm communicating from one axial face thereof with the passageway and a hole in the second diaphragm, remotely disposed from the other diaphragm, communicating from one axial face thereof, axially oppositely disposed from the other diaphragm's axial face, with the passageway.

5. A closure according to claim 4 wherein the diaphragms are substantially uniform in thickness and substantially identical in structure and wherein each diaphragm has a circular bead on one axial surface and a corresponding circular groove on its opposite axial surface and the diaphragms are so arranged juxtaposed to one another with the bead on one diaphragm bearing against a wall portion of the groove on the other diaphragm with an annular passageway provided therebetween.

6. A closure according to claim 5 wherein the diaphragms are metallic.

7. A closure according to claim 5 wherein the member is cup-shaped and the locking means are in the form of axially oppositely disposed radially extended fingers.

8. A closure according to claim 7 wherein the fingers extend radially inwardly toward one another and the diaphragms are arranged concentrically and axially within the confines of the member.

References Cited in the file of this patent

UNITED STATES PATENTS

| | | |
|---|---|---|
| 708,868 | Croft | Sept. 9, 1902 |
| 1,509,969 | Martin | Sept. 30, 1924 |
| 1,550,302 | Zarobsky | Aug. 18, 1925 |
| 1,832,591 | Stevens | Nov. 17, 1931 |
| 1,990,621 | Stant | Feb. 12, 1935 |
| 2,145,739 | Shaw | Jan. 31, 1939 |
| 2,203,801 | Swank | June 11, 1940 |
| 2,504,072 | Friend et al. | Apr. 11, 1950 |

FOREIGN PATENTS

| | | |
|---|---|---|
| 667,336 | Germany | Nov. 9, 1938 |